(12) United States Patent
Hannig

(10) Patent No.: US 8,024,904 B2
(45) Date of Patent: Sep. 27, 2011

(54) PANEL AND FASTENING SYSTEM FOR SUCH PANEL

(75) Inventor: Hans-Juergen Hannig, Bergisch Gladbach (DE)

(73) Assignee: Akzenta Paneele + Profile GmbH, Kaiseresch (DE)

( * ) Notice: Subject to any disclaimer, the term of this patent is extended or adjusted under 35 U.S.C. 154(b) by 0 days.

(21) Appl. No.: 11/780,322

(22) Filed: Jul. 19, 2007

(65) Prior Publication Data

US 2008/0010938 A1 Jan. 17, 2008

Related U.S. Application Data

(62) Division of application No. 10/486,457, filed as application No. PCT/DE02/02444 on Jul. 4, 2002, now Pat. No. 7,451,578.

(30) Foreign Application Priority Data

Aug. 10, 2001 (DE) .................................. 101 38 285

(51) Int. Cl.
 *E04B 2/00* (2006.01)
(52) U.S. Cl. ........... 52/586.1; 52/391; 52/588.1; 428/50
(58) Field of Classification Search .................. 52/582.1, 52/586.1, 592.1, 583.1, 584.1, 588.1, 587.1, 52/586.2, 585.1, 578, 390, 392, 533, 534, 52/539, 553, 589.1, 590.2, 590.3, 591.1, 52/591.2, 591.3, 591.4, 582.2, 582.4, 745.08, 52/745.19, 747.1, 747.11, 748.1, 748.11, 52/591.5; 403/334, 345, 364–368, 372, 375, 403/376, 381; 404/34, 35, 40, 41, 46, 47, 404/49–58, 68, 70; 428/44, 47–50, 57, 58, 428/60, 61, 106, 192–194
See application file for complete search history.

(56) References Cited

U.S. PATENT DOCUMENTS 1,723,306 A * 8/1929 Sipe ............................ 52/396.04
(Continued)

FOREIGN PATENT DOCUMENTS

EP  1-669-512  6/2006
(Continued)

OTHER PUBLICATIONS

Examination Report EP 10 15 7450 dated May 7, 2010 (12 pages).
(Continued)

*Primary Examiner* — William Gilbert
(74) *Attorney, Agent, or Firm* — Lucas & Mercanti, LLP

(57) ABSTRACT

The invention relates to a fastening system (1) for rectangular, tabular panels (2, 3, 10), especially floor panels. Comprising retaining profiles disposed on the small faces of said panels (2, 3, 10). Opposite retaining profiles match said retaining profiles in such a manner that similar panels (2, 3, 10) can be interlinked. The panels are provided with opposite first retaining profiles that are configured in such a manner that on a panel (2, 3, 10) being in first line a new panel (2) can be locked in second line by attaching the new panel (2) to the installed panel (3) at a temporary angle relative to the installed panel (3) and then swiveling it down into the plane of the installed panel (3). The panel further comprises opposite second retaining elements that comprise corresponding hook elements (6, 7). A hook connection (8) can be established by means of one of the hook elements (6, 7) of the new panel (2) and a hook element (6, 7) of a panel (3) that is already installed in second line by swiveling down the new panel (2). Every hook connection (8) is associated with an additional locking element (13, 22, 26, 27, 34, 35, 36, 40, 46) that prevents, in the hooked state of two panels (2, 3, 10), the book connection (8) from being released in a direction perpendicular to the plane of the installed panels (2, 3 10).

7 Claims, 13 Drawing Sheets

U.S. PATENT DOCUMENTS

| | | | | |
|---|---|---|---|---|
| 4,169,688 | A * | 10/1979 | Toshio | 404/40 |
| 4,316,351 | A * | 2/1982 | Ting | 52/309.9 |
| 4,449,346 | A * | 5/1984 | Tremblay | 52/509 |
| 5,274,979 | A | 1/1994 | Tsai | |
| 5,295,341 | A * | 3/1994 | Kajiwara | 52/586.2 |
| 5,706,621 | A * | 1/1998 | Pervan | 52/403.1 |
| 5,860,267 | A * | 1/1999 | Pervan | 52/748.1 |
| 5,921,047 | A * | 7/1999 | Walker | 52/585.1 |
| 6,536,178 | B1 * | 3/2003 | Pålsson et al. | 52/589.1 |
| 6,647,690 | B1 * | 11/2003 | Martensson | 52/601 |
| 6,763,643 | B1 * | 7/2004 | Mårtensson | 52/586.1 |
| 6,769,835 | B2 * | 8/2004 | Stridsman | 404/41 |
| 2007/0006543 | A1* | 1/2007 | Engstrom | 52/582.1 |
| 2007/0193178 | A1* | 8/2007 | Groeke et al. | 52/578 |

FOREIGN PATENT DOCUMENTS

| | | |
|---|---|---|
| SE | 515324 | 7/2001 |
| WO | 84/02155 | 6/1984 |
| WO | 96/27719 | 9/1996 |
| WO | 98/40583 | 9/1998 |
| WO | 99/66151 | 12/1999 |
| WO | 00/47841 | 8/2000 |
| WO | 01/02669 | 1/2001 |
| WO | 01/51732 | 7/2001 |
| WO | 01/75247 | 10/2001 |
| WO | 01/98604 | 12/2001 |
| WO | 03/016654 | 2/2003 |

OTHER PUBLICATIONS

Examination Report 10 157 450.7 2303 dated Jul. 23, 2010 (13 pages).
Examination Report 10 157 450.7 2303 dated Nov. 23, 2010 (7 pages).
Examination Report dated Sep. 30, 2010 (6 pages).
Objection dated Dec. 21, 2010 (7 pages).

* cited by examiner

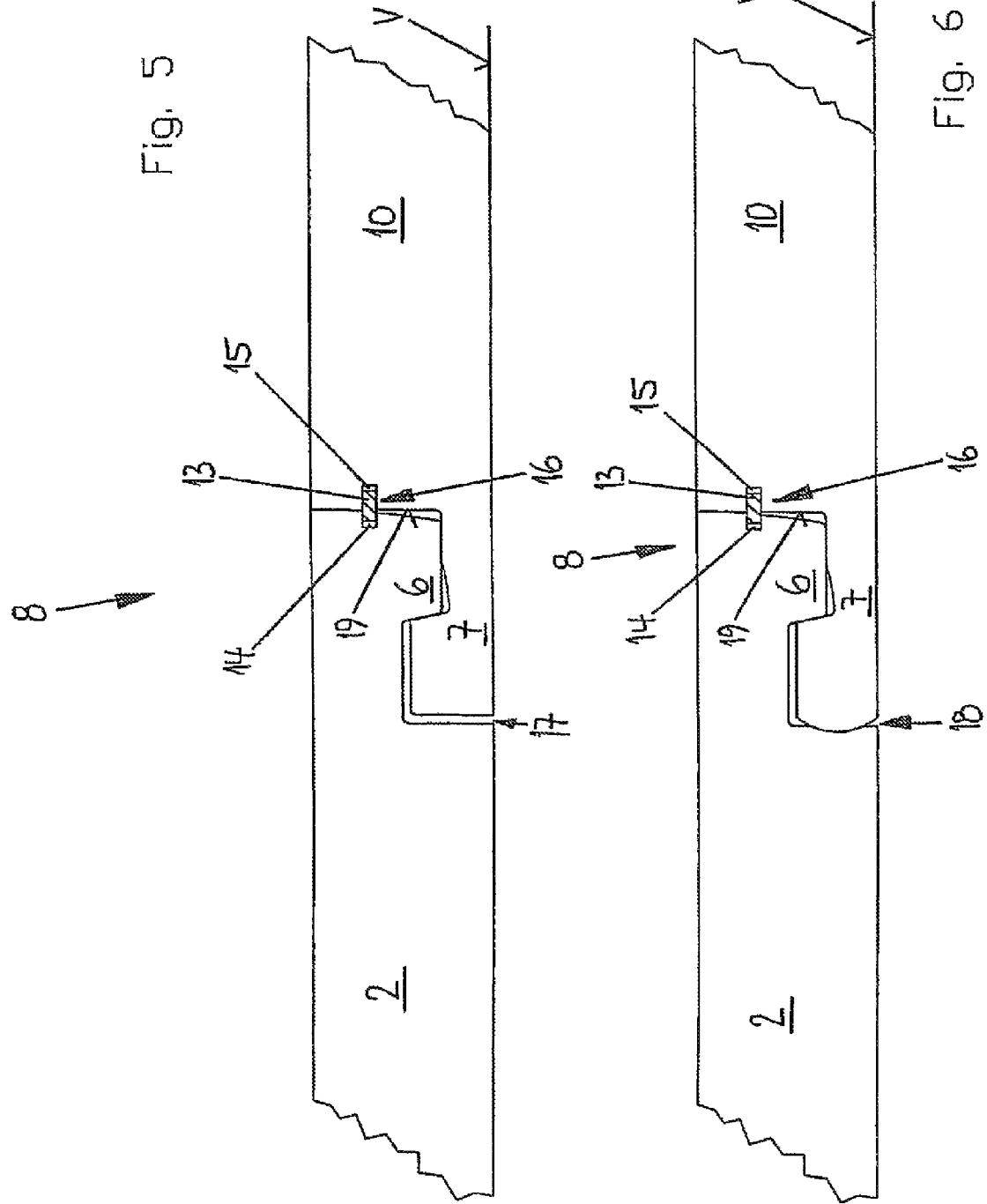

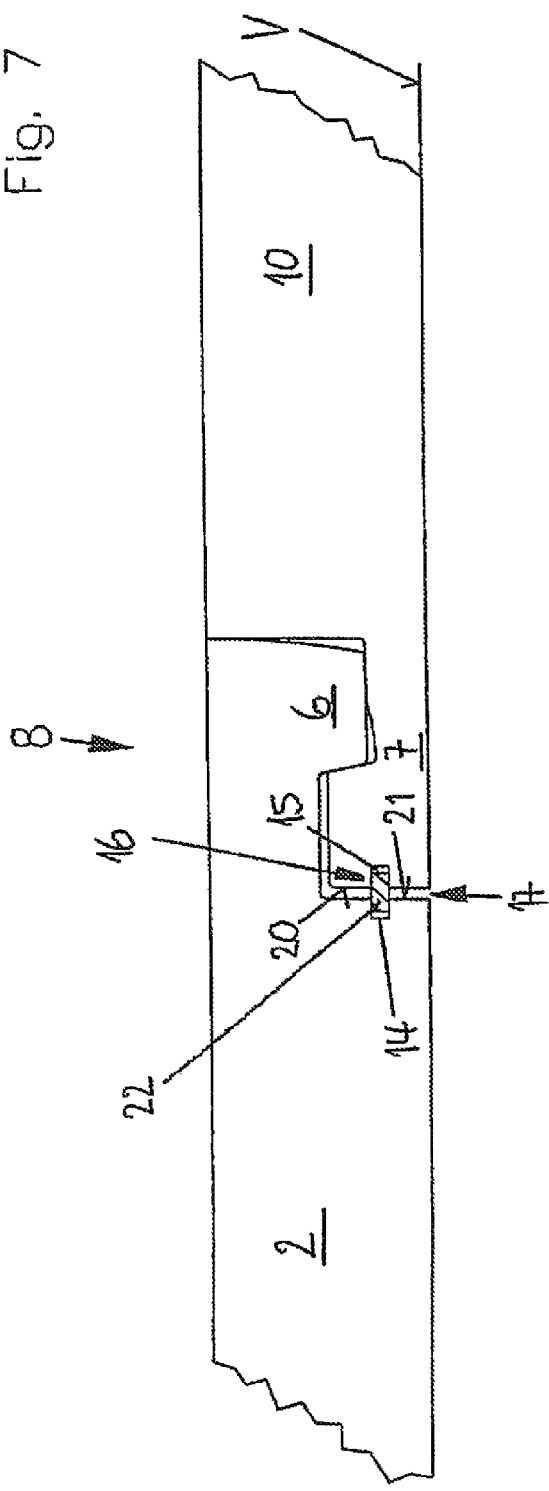

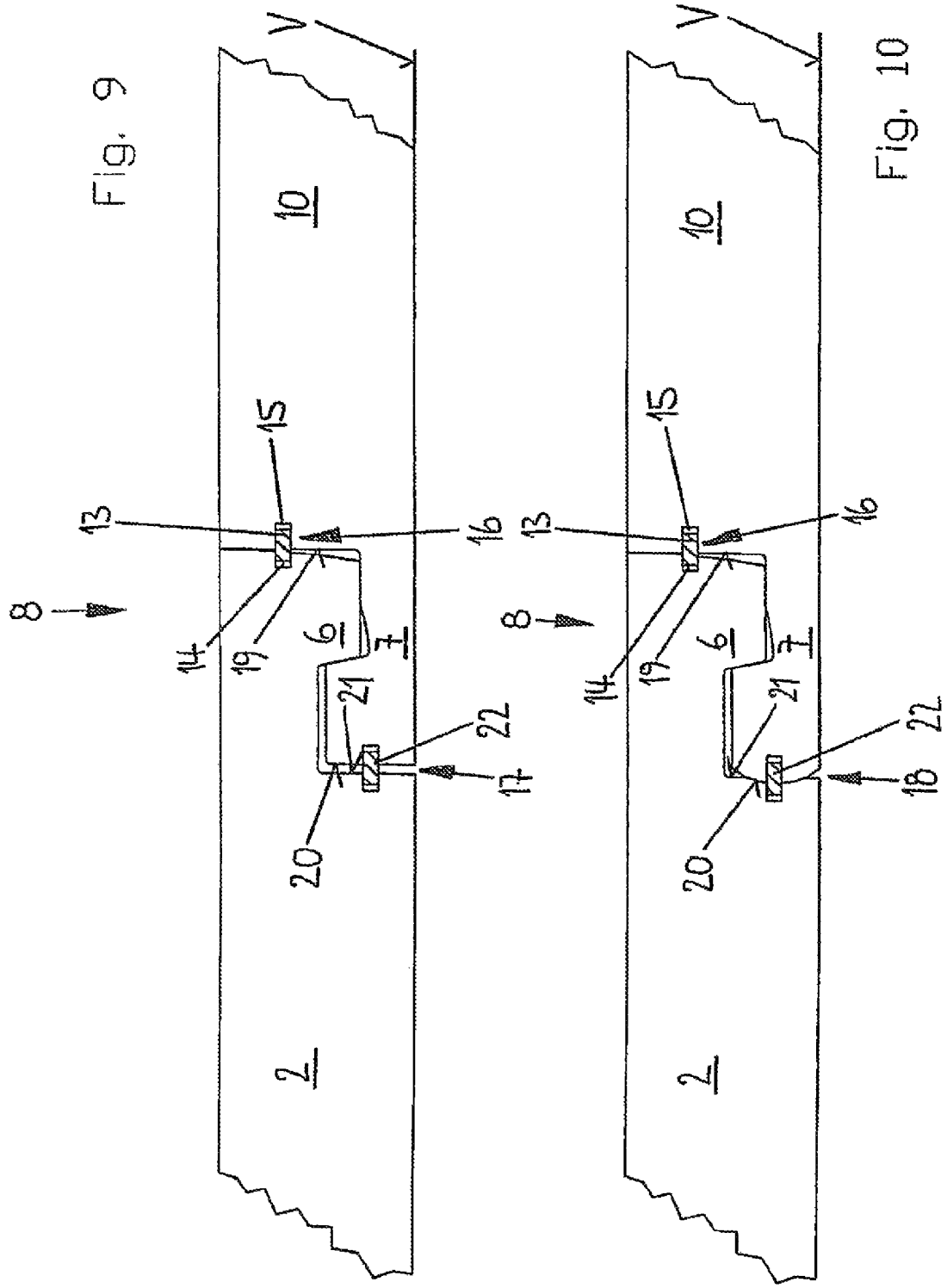

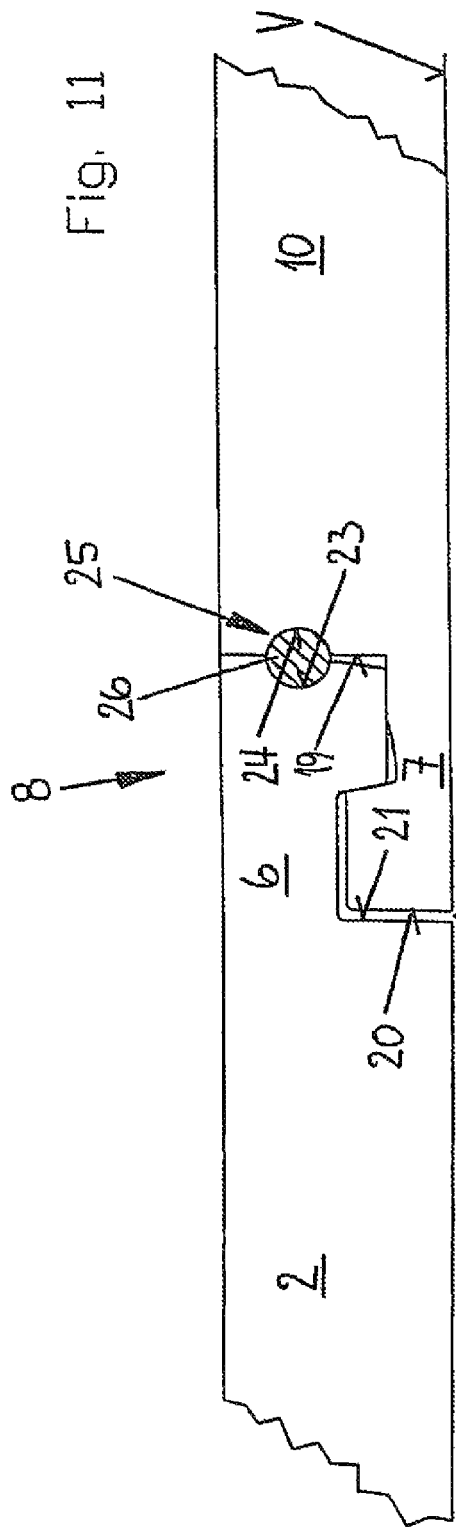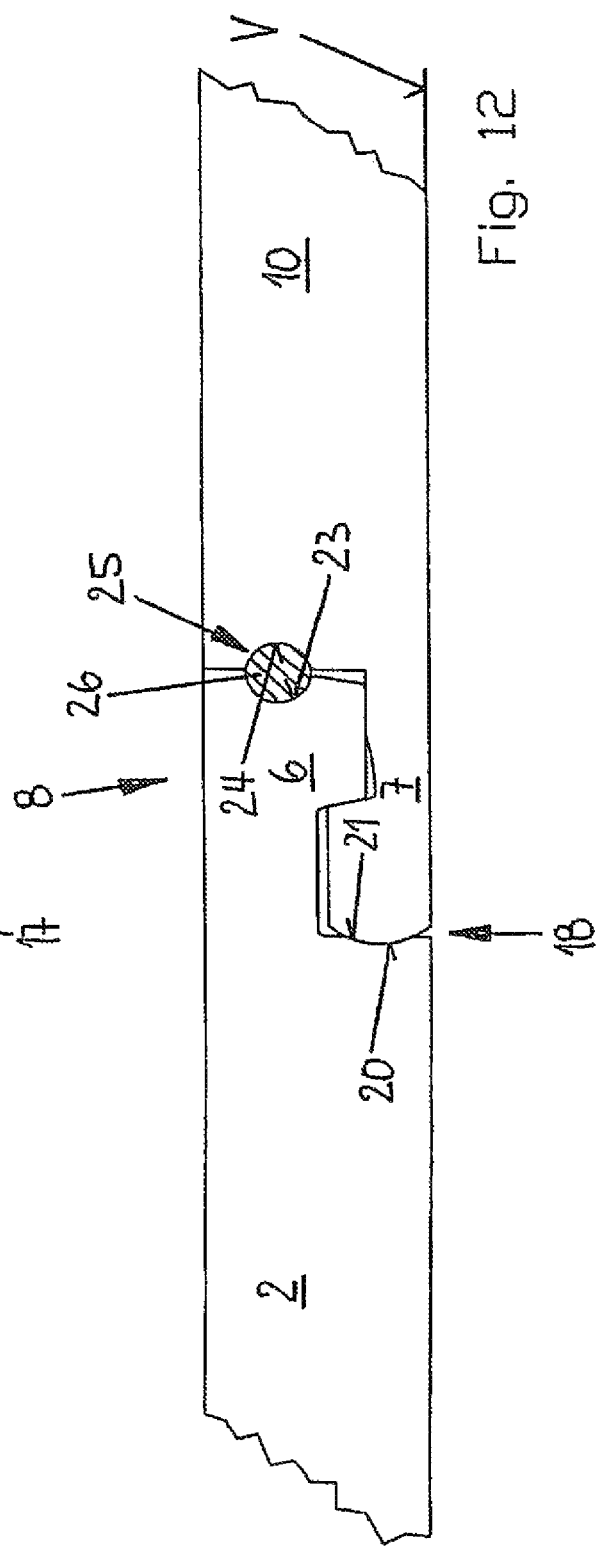

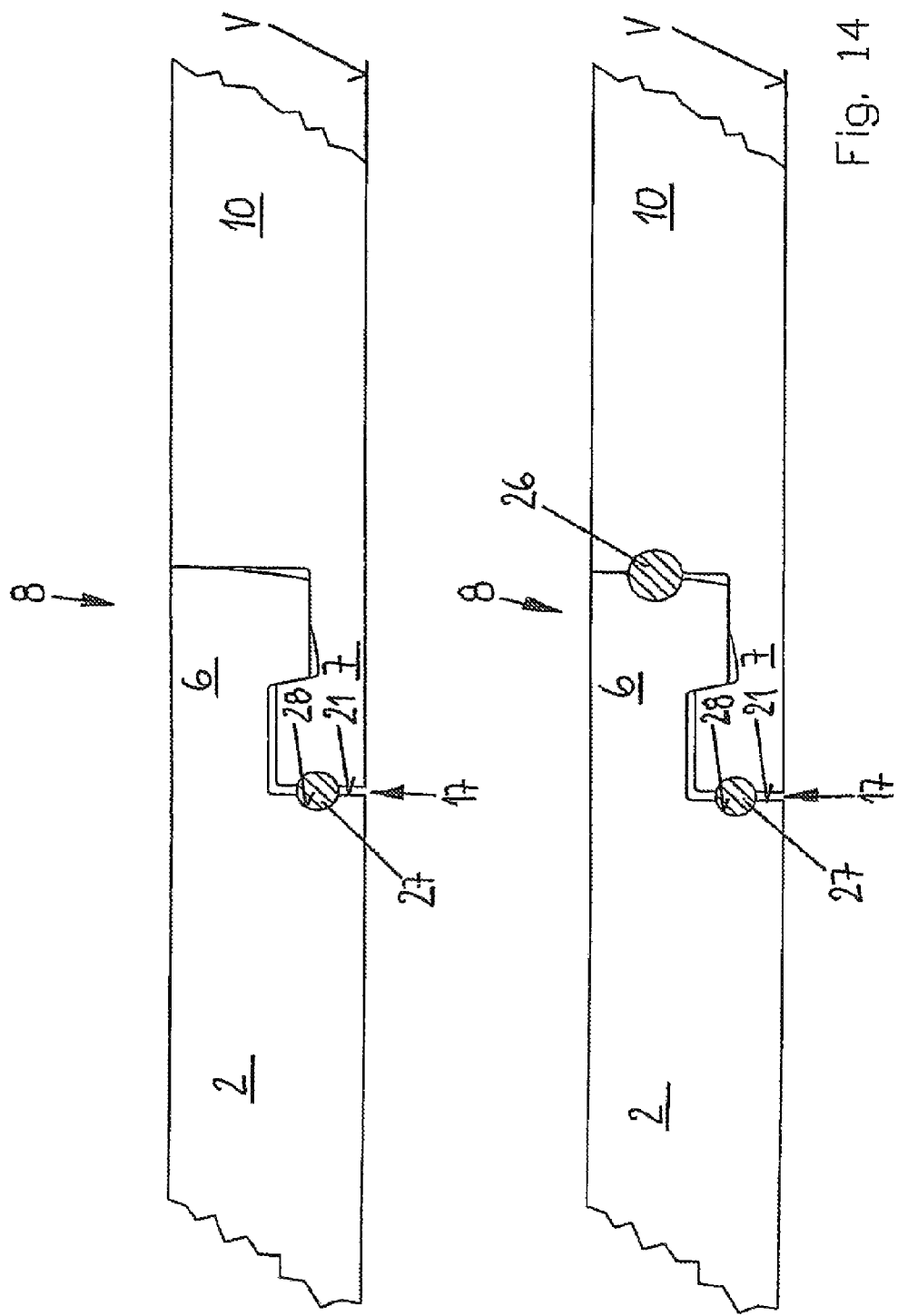

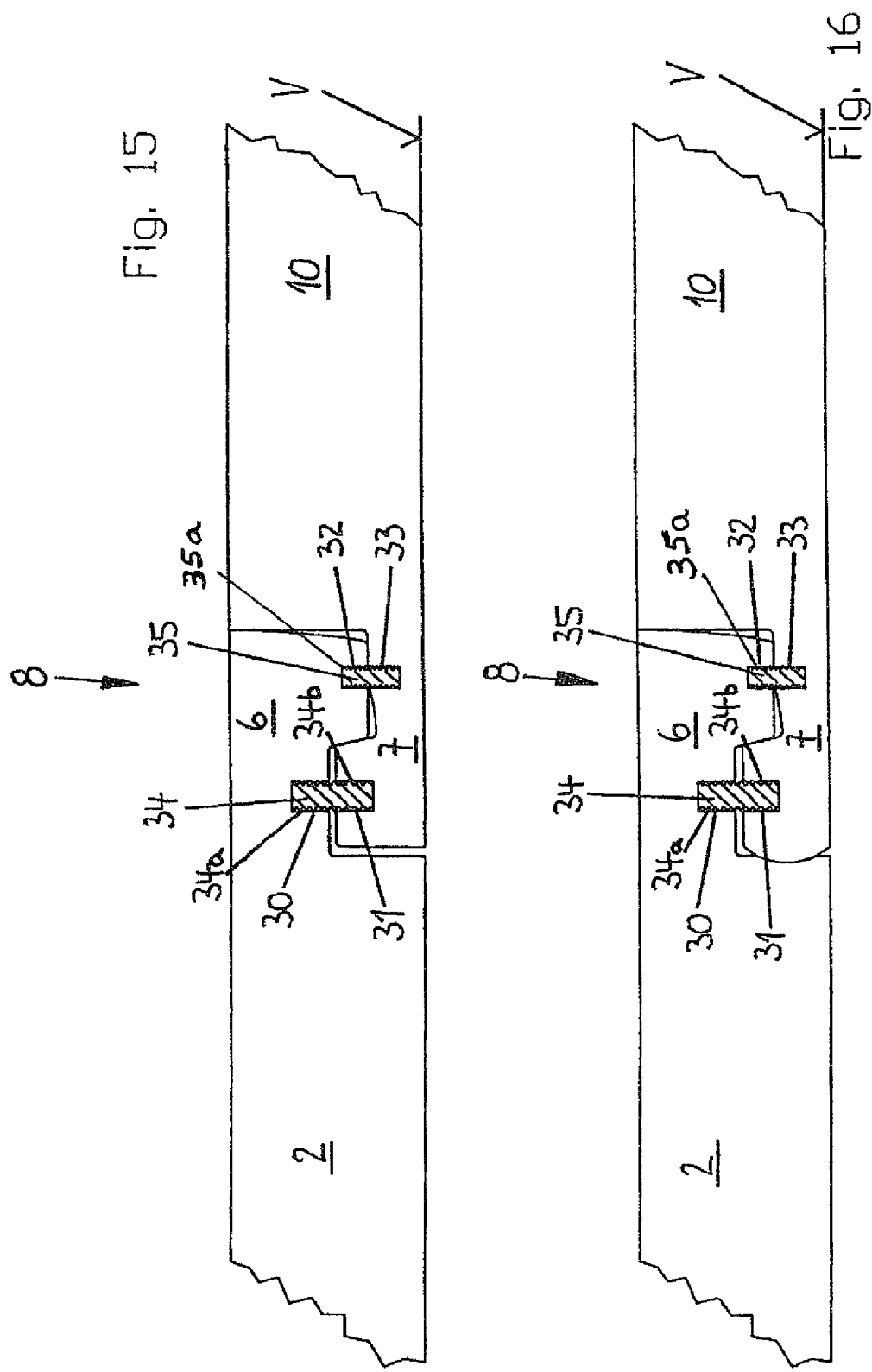

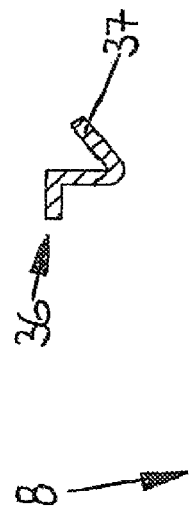
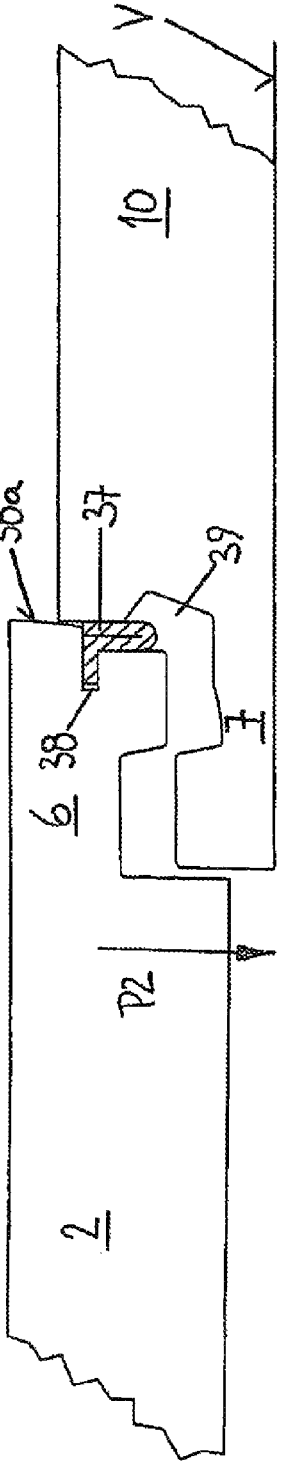
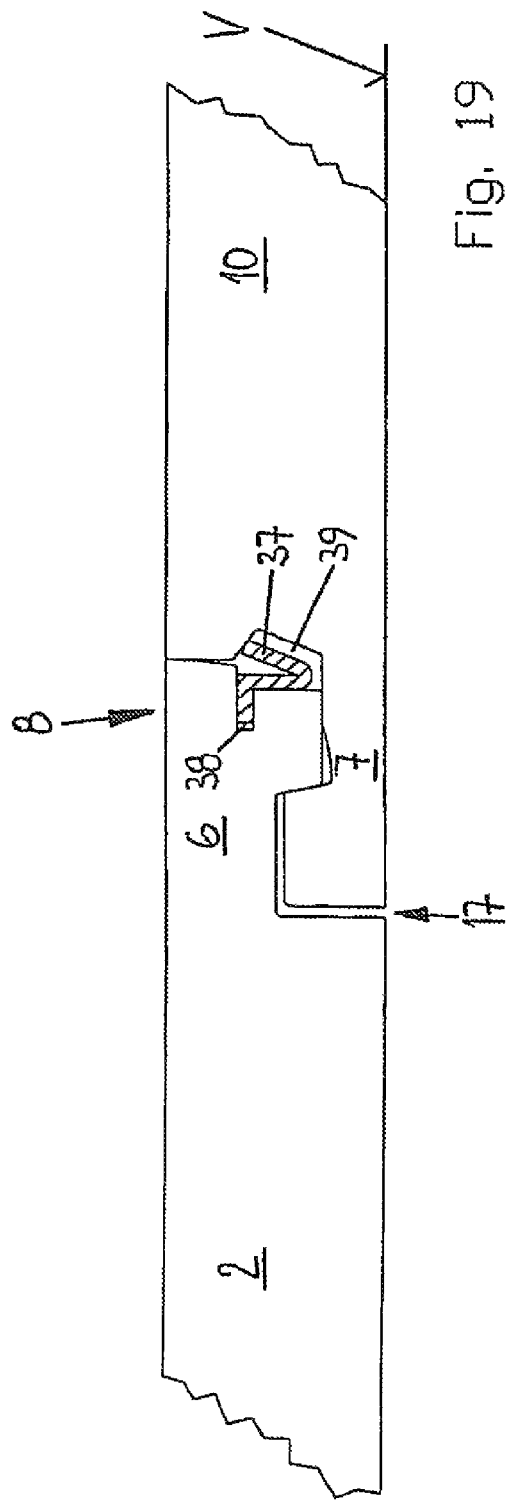

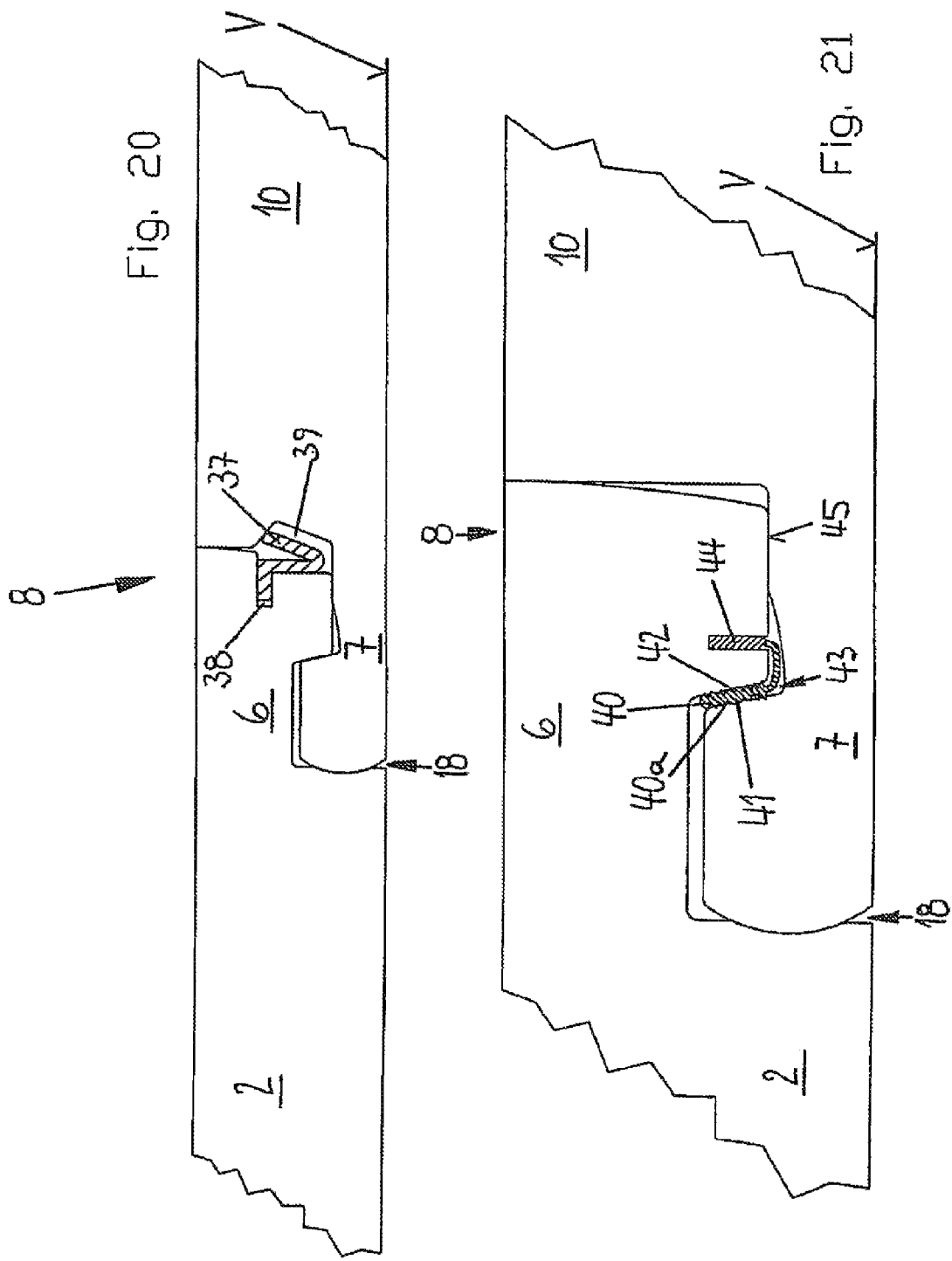

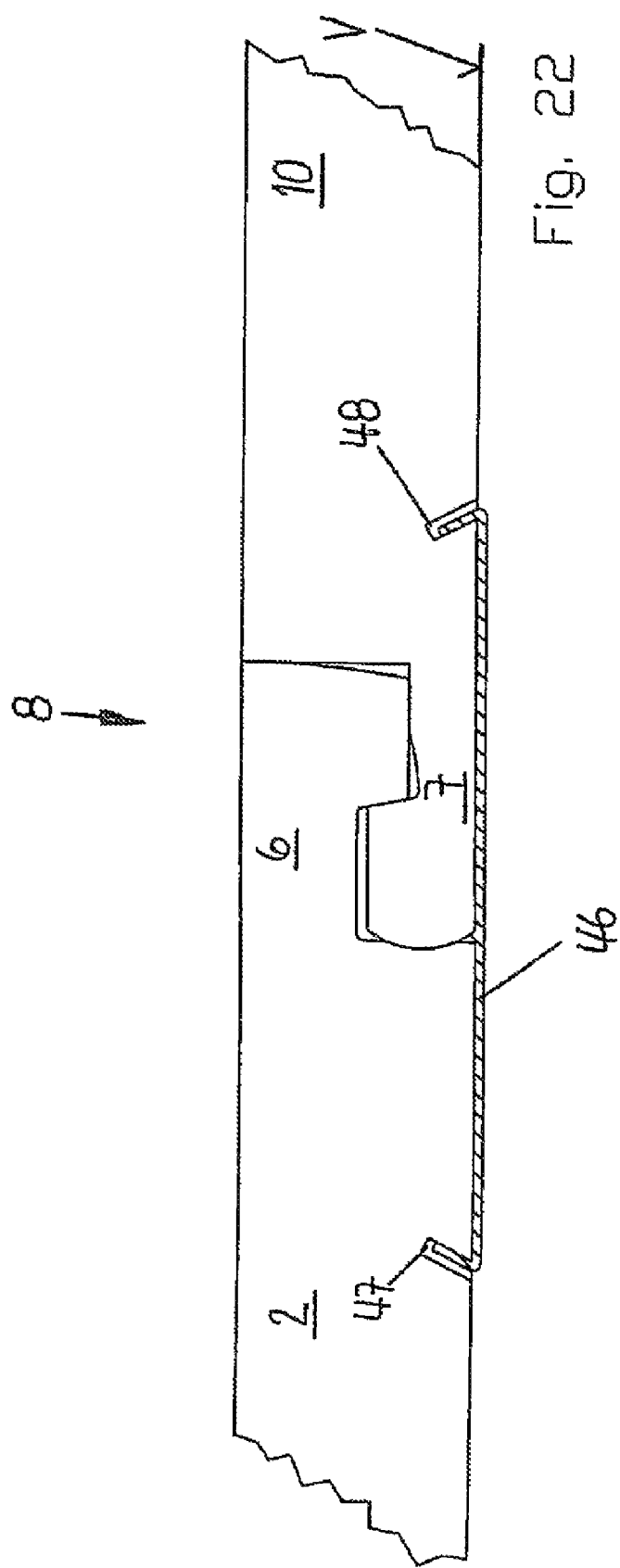

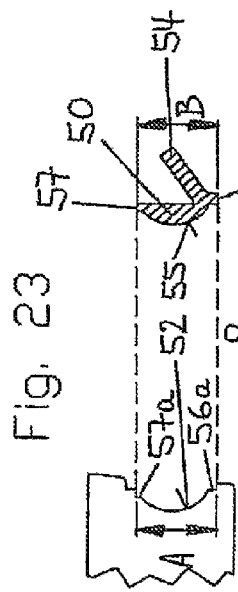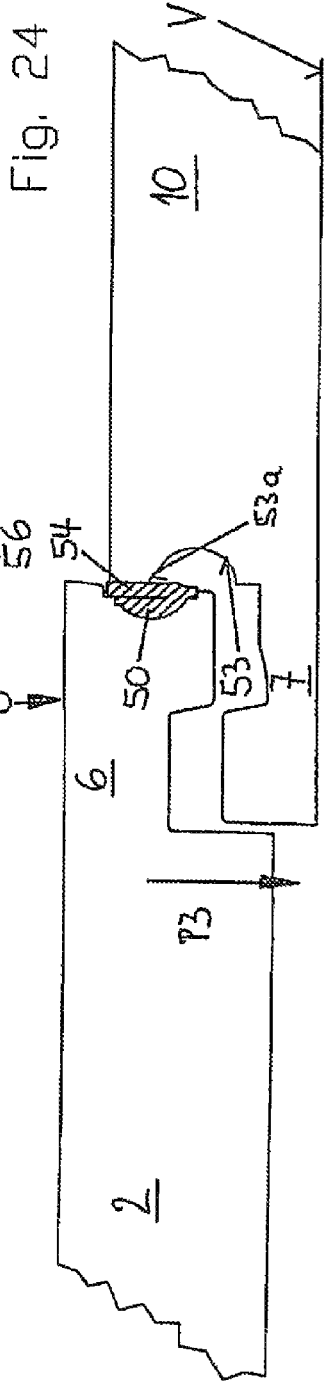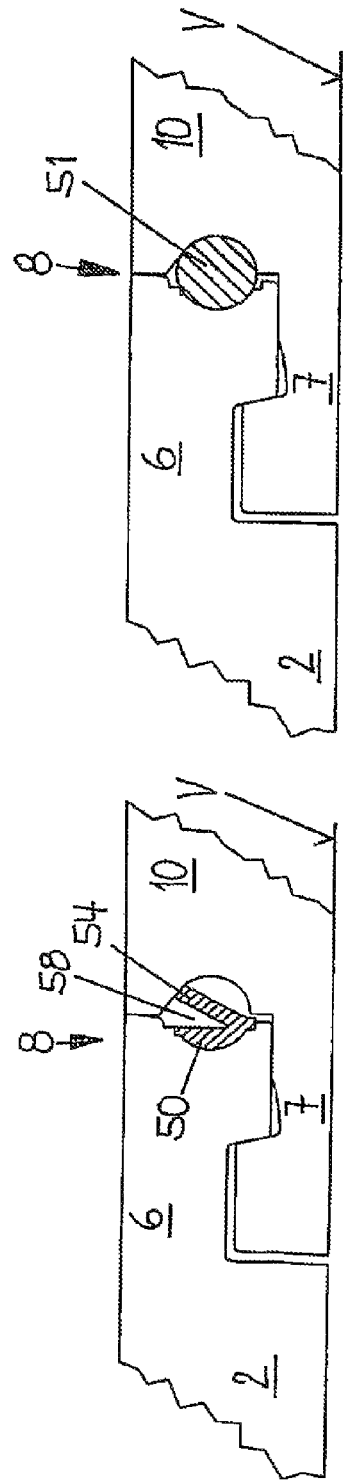

PANEL AND FASTENING SYSTEM FOR SUCH PANEL

BACKGROUND OF THE INVENTION

1. Field of the Invention

The invention relates to a fastening system for rectangular, tabular panels, especially floor panels, comprising retaining profiles disposed on the small faces of said panels. Opposite retaining profiles match said retaining profiles in such a manner that similar panels can be interlinked. The retaining profiles are designed as first retaining profiles on opposite small faces and as second retaining profiles on the remaining small faces, in such a way that, on a panel in a first line, a new panel can be locked in a second line by attaching the new panel to the installed panel at a temporary angle relative to the installed panel and then swiveling it down into the plane of the installed panel, where the opposite second retaining elements display corresponding hook elements and where a hook connection can be established by means of one of the hook elements of the new panel and a hook element of a panel that is already installed in the second line by swiveling down the new panel. Each hook connection is associated with an additional, loose locking element that, in the hooked state of two panels, prevents release of the hook connection in a direction perpendicular to the plane of the installed panels, provided that the locking element is located in a locking groove of one of the hook elements of a first panel and the locking groove is provided on a surface of the hook element that, in the installed state of the panels, is oriented approximately perpendicular to the plane in which the panels are installed.

2. Background of the Art

A fastening system without an additional locking element is known from DE 199 29 896 A1. A characteristic feature of a fastening system of this kind is that the first and second retaining profiles used have very different geometries and that the joining methods of the different types of retaining profile differ greatly as a result. In particular, the second retaining profiles, which are designed as hook elements and joined to form a hook connection, involve a technical problem. While the familiar hook connection effectively prevents floor panels from being slid apart in the plane at right angles to the small faces of the connected panels, it does not afford satisfactory resistance to the hook elements being released in a direction perpendicular to the plane of the installed panels.

A fastening system of this kind is used with preference for so-called laminate flooring that displays a core made of a wood material, such as MDF, HDF or particleboard material. The mechanical retaining profiles are generally milled into the small faces of boards made of wood materials.

Laminate flooring is predominantly laid in floating fashion. To reduce footstep sound, a footstep sound-insulating intermediate layer is usually laid between the base surface and the laminate panels. It is also known for a footstep sound-insulating layer to be permanently attached to the underside of laminate panels that faces the base surface.

The hook connection of the known fastening system is particularly problematic if, in the region of a hook connection, only the panel whose hook element is at the bottom, i.e. facing the base surface, is exposed to a high load. The upper hook element of the adjacent panel, hooked into the bottom hook, is not exposed to loading, as a result of which the load only presses the panel with the hook element at the bottom into the generally soft footstep sound-insulating intermediate layer. The top hook element of the non-loaded panel releases itself from the bottom hook element of the adjacent panel in the process. The hook connection ceases to function, and the function usually cannot be restored.

According to the prior art, undercuts are integrated in the hook connection, by means of which releasing of the hook connection perpendicular to the installation plane of the panels is said to be prevented. These undercuts have, however, proven to be insufficient to afford this kind of fastening element sufficient strength.

A generic fastening system displaying an additional locking element in known from WO 01/51732 A1. Following interlocking of the hook elements, the locking element has to be subsequently inserted at the point of connection. This requires an additional work step. Moreover, fitting of the locking element causes problems if a row of panels is located very close in front of a wall. Insufficient space is then available for the locking element to be inserted at the point of connection.

SUMMARY OF THE INVENTION

The object of the invention is to develop a fastening system that is equipped with a hook connection that does not release itself even when the panel with the bottom hook element is subjected to a load and the upper hook element of the adjacent panel is not loaded.

According to the invention, the object is solved in that each hook connection is associated with an additional locking element that prevents, in the hooked state of two panels, the hook connection from being released in a direction perpendicular to the plane of the installed panels.

This innovative locking element can be a very simple component, for which there are various designs. The locking element can be supplied loose with panels, so that the layer himself can attach it at the envisaged point on the hook element during installation, after hooking the hook elements together or it can be already pre-mounted for the layer when he installs the panels. Consequently, the layer does not have to work with any loose connecting parts. Alternatively, a locking element can be integrated into the core material of the panel.

In a particularly simple embodiment, each of the hook elements of the opposite small faces of a panel displays a locking groove extending in the longitudinal direction of the small face. When the hook elements are connected, the locking grooves of two panels are adjacent to each other, forming a common locking recess. When profiling the hook elements with milling tools, the locking grooves can be included in the milling process very easily. Appropriate contours must be provided on the milling tools for this purpose.

If the locking recess has a round or rectangular cross-section, this has the advantage that particularly inexpensive standard material can be used for the locking elements. Any desired material is open to consideration for locking elements with a round or rectangular cross-section. Corresponding rod material can, for example, be purchased in ready-made form, or by the metre for cutting into locking elements of appropriate length. For locking grooves that together form a locking recess with a round cross-section, it is particularly favorable if a nail is used as the locking element, or if the locking element is designed in the manner of a nail. The head of a nail facilitates not only insertion of the locking element into the hook connection during installation, but also removal of the locking element if the hook connection needs to be released again for the purpose of disassembling the panels.

It is very useful if, in the hooked state of two panels, the locking element can simply be inserted into the locking recess wherein the cross-section of the locking element at least partially protrudes into the cross-section of the locking groove of the one panel and partially into the cross-section of the locking groove of the other panel. The division of the cross-section between the locking grooves can be selected virtually at random. It can, for example, be made dependent on whether one of the hook elements in which the locking groove is located is designed more stably than the other. The locking element can be inserted into the locking recess by sliding or hammering. The tolerances of the locking element and the locking recess can be designed in such a way that the locking element can be inserted into the locking recess either loosely or tightly.

Preferably, when a simple locking element with a round or polygonal cross-section is involved, it is advantageous for the locking grooves to be provided on hook element surfaces that, in the installed state of the panels, are oriented roughly perpendicular to the plane in which the panels are installed.

An alternative design of a fastening system with hook elements provides for each panel, in installed state, to display undercut bottom recesses on the underside facing the base surface, at least one of which is located in the region of each hook element on the underside of the panel.

The handling can be improved if, in the connected state of two panels, the undercut of the bottom recess of a first panel is oriented in the opposite direction to the undercut of the bottom recess of a second panel. For the fastening system design with bottom recesses in the region of the hook elements, the locking element is expediently designed as a U-shaped clip that, in assembled state, engages the undercut of the bottom recess of the first panel and the undercut of the bottom recess of the second panel.

In a third alternative for a fastening system, the locking element is located in a locking groove of one of the hook elements of a first panel and displays a resilient snap tab. In this context, a locking groove of the associated hook element of the opposite small face of a second panel forms an undercut snap-in depression, into which the snap tab of the hook element of the first panel snaps automatically during installation.

This design can be provided straightforwardly with a locking element displaying a snap tab projecting far beyond the small face in relaxed state, which snap tab comes into contact with the hook element of the adjacent panel during downward swiveling of a new panel into the plane of the installed panels and is automatically bent so far back that the snap tab no longer projects beyond the outer end of the hook element on the small face. When the hook connection has almost reached its locking position, the snap tab automatically springs forwards into the snap-in depression of the hook element of the adjacent panel, locking the hook connection in the vertical direction, i.e. perpendicular to the plane of the installed panels.

An automatic snap element of this kind can be pre-mounted in one of the hook elements, or enclosed separately so that the layer can attach it to the envisaged hook element himself during installation of the panels.

The automatic locking element and the snap-in depression are expediently designed in such a way that the locking element can easily be pulled out of the hook connection in the longitudinal direction of the small faces at any time using a simple tool, such as pointed pliers, if the panels need to be disassembled. To this end, a free space is provided on either side of the snap tab, so that pliers can be applied.

The fundamental advantage of locking by means of a snap-in locking element, as opposed to a locking element to be slid in, is that no space is required in front of the small face of a row of panels for positioning the locking element against a locking recess and sliding it into said recess. Close to a wall, a locking element that needs to be slid in can no longer be inserted into a locking recess, whereas the snap-in locking element can easily be attached laterally to one of the hook elements and locked by swiveling down a new panel.

A fourth alternative for the fastening system provides for the locking element to be designed as a claw component which, in installed state, is located between interlocking hook surfaces of the hook elements. The claw component has claw elements that grip into the surface of the hook surfaces and prevent vertical separation of the hook elements.

Preferably, a space for the claw component is provided between the interlocking hook surfaces in order to avoid excessive constraining forces between the hook elements.

Furthermore, it is useful if the claw component is locked in a recess provided in the hook element for this purpose and, in the assembled state of the hook connection, adapts to the hook element, starting at the recess and extending over the hook surface.

Straightforwardly, the recess for the claw component can be located on the part of the hook element that engages the corresponding hook element, where the opening of the recess is located on a surface of the hook element that faces the base surface and where, in the assembled state of the hook connection, the claw component is bent in such a way that it projects between the engaging hook surfaces.

Handling of the claw component is facilitated by the fact that it is of L-shaped design and that a first leg of the L-shaped claw component can be inserted in the recess of the hook element and a second leg, provided with the claw elements, points in the direction of the hook surface of the same hook element. In this context, the latter leg is automatically bent into the space between the engaging hook surfaces during installation.

The purpose of a further useful improvement is that one and the same locking recess formed by locking grooves of two hook elements can serve to accommodate different locking elements that display different geometries and afford the hook connection the necessary strength by means of different locking mechanisms. The locking grooves and locking elements are specially coordinated with each other to this end. In this context, either a rod-shaped locking element can be slid into the locking recess in its longitudinal direction or, alternatively, a locking element displaying a resilient snap tab can be accommodated in the same locking recess, where one of the locking grooves then forms a retaining mount for the locking element provided with the snap tab, and the associated locking groove forms an undercut snap-in depression that the resilient snap tab engages automatically during assembly of the hook connection.

A panel with a fastening system according to the invention displays two different types of interacting retaining profiles. The retaining profiles via which the individual rows of a laid floor are interlocked display retaining profiles that are interlocked according to the principle of inclined attachment of a new panel with subsequent downward swiveling of the same. The type of retaining profile required for this makes it possible to mechanically interlock a new panel on a row of installed panels by means of a hinge-like swiveling movement. As a result, the individual panel rows are protected against being pulled apart in the plane in a direction perpendicular to the interlocked retaining profiles.

On the remaining two small faces of the panel, retaining profiles are provided in the form of hook elements, where a first hook element projects from the small face and, in the installed state, faces the base surface, and the second hook element projects from the small face and faces the decorative top side of the panel. Both hook elements of a hook connection are protected against moving apart in a direction perpendicular to the plane of the installed panels by an additional locking element.

BRIEF DESCRIPTION OF THE DRAWINGS

An example of the invention is illustrated below in a drawing and described in detail on the basis of the Figures. The Figures show the following.

DETAILED DESCRIPTION OF SPECIFIC EMBODIMENTS

Figure 1:
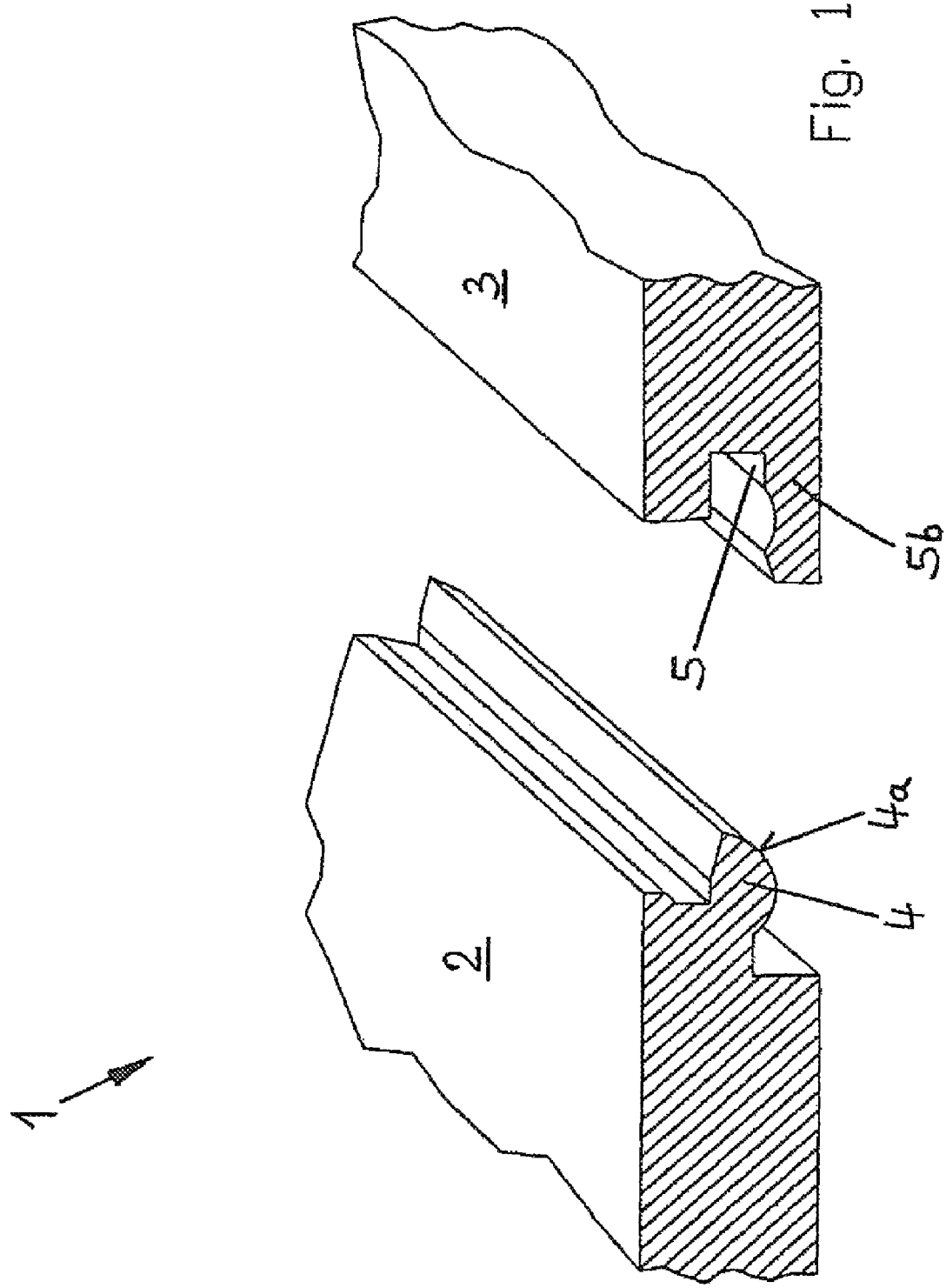
FIG. 1 A perspective view of a retaining profile that can be mechanically interlocked by attaching a new panel at an angle and subsequently swiveling it down into the plane of the installed panels, FIG. 2 The attachment at an angle of the retaining profiles according to FIG. 1, FIG. 3 The retaining profiles according to FIG. 1 in the interlocked state, FIG. 4 Retaining profiles in the form of hook elements according to the prior art, FIGS. 5-10 Embodiments of a hook connection with one or more additional locking elements with a rectangular cross-section, FIGS. 11-14 A design of a hook connection with one or more additional locking elements displaying a round cross-section, FIGS. 15/16 Embodiments of a hook connection with locking elements that, in the installed state of the panels, are recessed into hook element surfaces that lie in a roughly horizontal position, FIG. 17-20 An embodiment of a hook connection with a locking element with a resilient snap tab that automatically engages an associated snap-in depression during assembly of the hook connection, FIG. 21 A hook connection with a locking element designed as a claw component, FIG. 22 A hook connection with a locking element designed as a clip on the underside of the panels, FIG. 23 A further locking element with a resilient snap tab and a locking groove adapted to accommodate the locking element, FIG. 24 A hook connection with the locking element according to FIG. 23 during the connecting procedure, FIG. 25 A hook connection with the locking element according to FIG. 23 in engaged state, FIG. 26 A hook connection with the same locking grooves and the same locking recess as according to FIG. 25, where the snap tab locking element is replaced by a locking element with a round cross-section.

FIG. 1 of the drawing shows a perspective view of one type of retaining profile for fastening system 1 according to the invention. The opposite small faces of panels 2 and 3 are provided with corresponding retaining profiles, so that adjacent panels 2 and 3 can be connected to each other. This type of retaining profile is a modified tongue-and-groove joint, where tongue 4 engages an undercut in the lower groove wall of groove 5, so that, in the installed state, the two panels 2 and 3 are protected against being pulled apart in the plane of installed panels 2 and 3 and perpendicular to the direction of the interlocked small faces.

Figure 2:
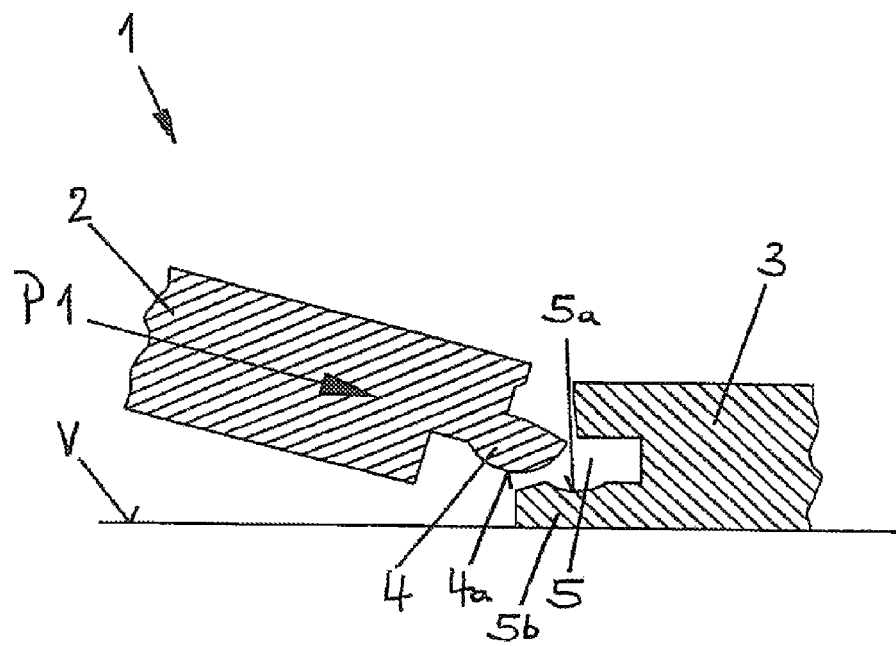
Figure 3:
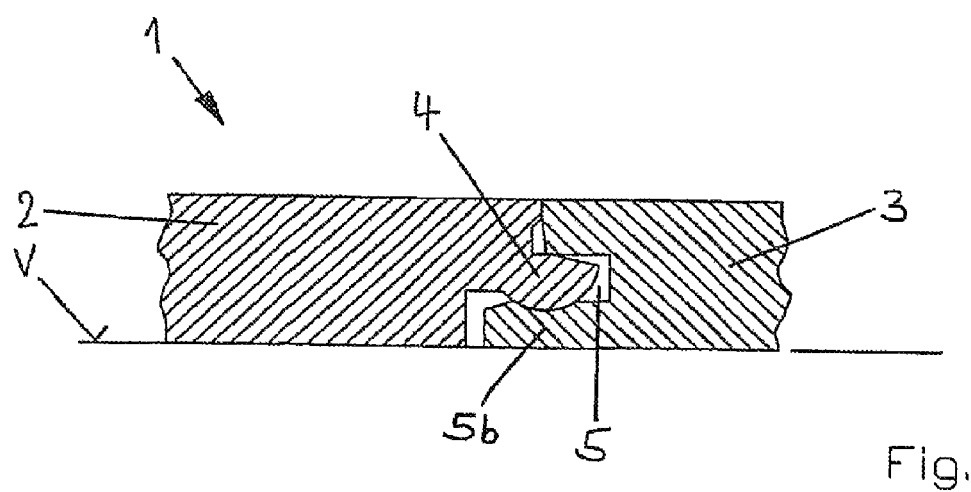

FIG. 2 shows the attachment of a new panel 2 at an angle. In this context, tongue 4 of new panel 2 is always engaged with groove 5 of installed panel 3 in the direction of arrow P1, and new panel 2 is subsequently swiveled down onto base surface V until the position illustrated in FIG. 3 is reached. It is easily comprehensible that a curved area 4a of the cross-section of tongue 4 engages a depression 5a with a curved cross-section in bottom groove wall 5b of groove 5 in such a way that panels 2 and 3 are prevented from being slid apart in the plane perpendicular to the interlocked small faces.

The remaining small faces of a panel 2 or 3, equipped with fastening system 1 according to the invention, are provided with corresponding retaining profiles with hook elements 6 and 7. These have the advantage that they hook into each other simultaneously, as it were, with the interlocking of the retaining profiles described according to FIGS. 1 to 3, tongue 4 and groove 5, following attachment at an angle, as a result of new panel 2 being swiveled down onto base surface V. No lateral joining movement of any kind whatsoever is necessary to establish resultant hook connection 8.

Figure 4:
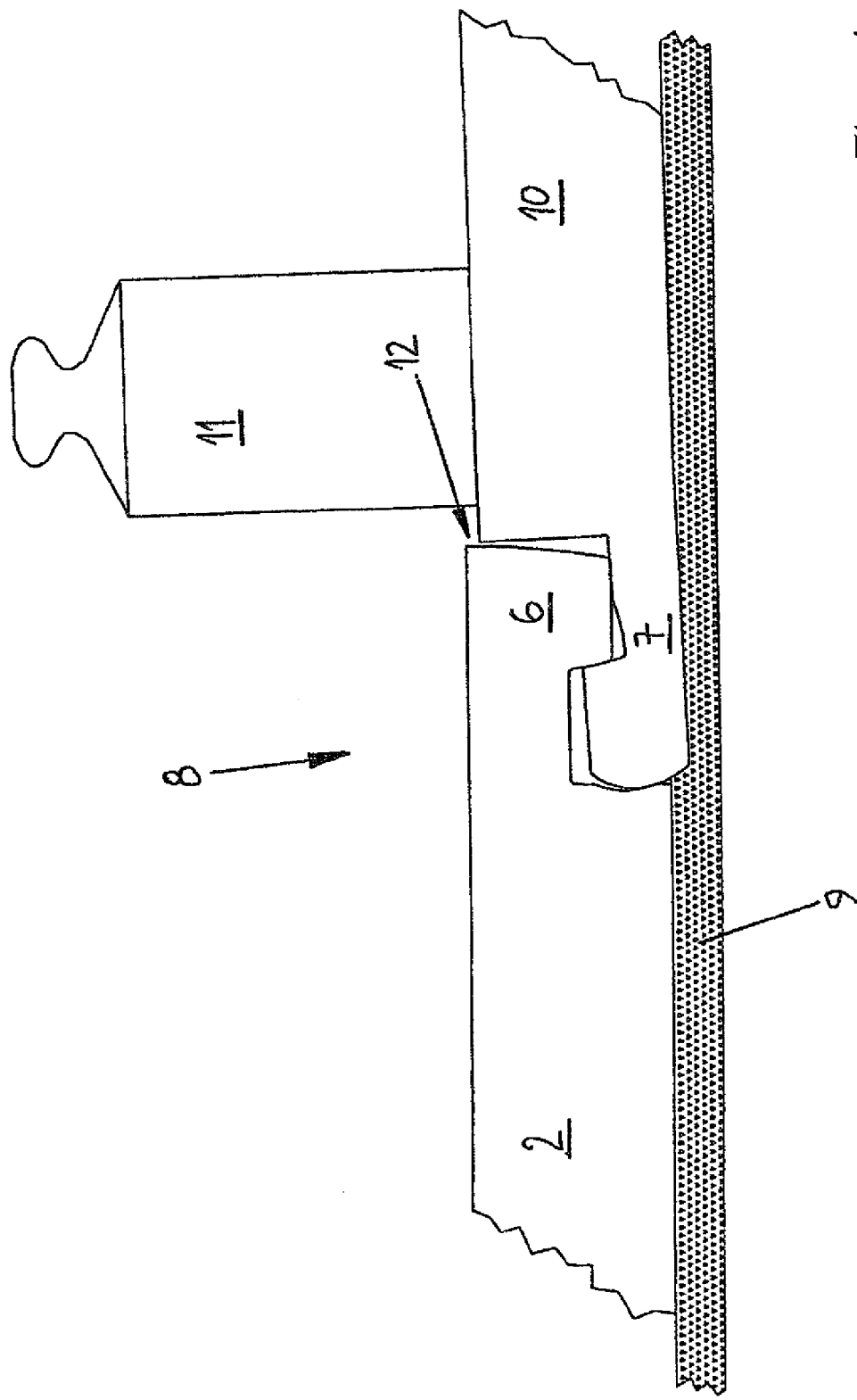

Hook connection 8, illustrated in FIG. 4, disengages. This occurs, for example, on uneven substrates, where there is air between the panels and base surface V, and also when a soft, footstep sound-insulating intermediate layer 9 is located between the panels and base surface V. The symbolically represented weight 11 in FIG. 4 illustrates how a panel whose hook element faces the base surface sinks into soft, footstep sound-insulating intermediate layer 9 when exposed to the load of weight 11. This results in vertical offset 12 at the surface of panels 2 and 10.

FIGS. 5 to 10 illustrate different embodiments of hook connections 8, all of which are interlocked with an additional locking element 13. Locking element 13 prevents hook connection 8 moving apart in a direction perpendicular to the plane of installed panels 2 and 10. Even when loaded in accordance with FIG. 4, additional locking element 13 prevents vertical offset of hooked panels 2 and 10. Locking element 13 has a rectangular cross-section in the embodiments in FIGS. 5 to 10. Locking grooves 14 and 15 are provided to accommodate locking element 13 and, in the hooked state of hook elements 6 and 7, are positioned exactly opposite each other in such a way that a common locking recess 16 is formed, into which locking element 13 is inserted in a direction perpendicular to the drawing plane shown. The embodiment according to FIG. 5 shows a free space 17 between the free end of hook element 7, which faces base surface V, and the small face of associated panel 2.

In FIG. 6, on the other hand, no clearance is provided at the same point. Instead, an undercut connection 18 is provided here, which likewise interlocks in a direction perpendicular to the plane of installed panels 2 and 10. On panel 2, whose hook element 6 faces the surface, a freely projecting surface of the small face of hook element 6 displays locking groove 14, while locking groove 15 of opposite hook element 7 of hook connection 8 is provided on a receding surface 19 of hook element 7. The same applies to the embodiment according to FIG. 6.

FIGS. 7 and 8 show examples of a hook connection 8, where the small face is provided with additional locking element 22 accommodated in locking groove 15 on freely projecting surface 20 of hook: element 7, which faces base surface V. Accordingly, locking groove 14 on corresponding hook element 6 is located on receding surface 21 of hook element 6 on the small face of panel 2. FIG. 7 shows an example where hook elements 6 and 7 display a free space 17 in the region of locking element 22. In contrast, according to FIG. 8, no free space is provided between hook elements 6 and 7 in the region of locking element 22. Instead, undercut connection 18 increases the resistance of hook connection 8 to being pushed apart in a direction perpendicular to the plane of installed panels 2 and 10.

FIGS. 9 and 10 show designs in which each hook connection 8 is equipped with two locking elements 13 and 22. According to FIG. 9, the positions of locking elements 13 and 22 are taken from a combination of FIG. 5 and FIG. 7. In FIG. 10, the positions of locking elements 13 and 22 are taken from a combination of FIGS. 6 and 8. FIG. 9 is a further example of a hook connection 8 where the free end of hook element 7 facing base surface V displays a space 17 between it and the small face of hook element 6 of adjacent panel 2, whereas FIG. 10 provides an undercut connection 18 at the same point.

According to FIGS. 11 to 14, locking elements with a round cross-section are provided. According to FIG. 11, an integral locking groove 23 with a semi-circular cross-section is provided on the outer free end of hook element 6, which faces the upper side of panel 2. On corresponding hook element 7, a locking groove 24 is provided accordingly on receding surface 19 of hook element 7, meaning that the two locking grooves 23 and 24 together produce locking recess 25 with a circular cross-section, in which locking element 26 is located. The same applies to the embodiment according to FIG. 12. In FIG. 11, a free space 17 is provided between hook element 7 of the one panel 10, which faces base surface V, and a receding surface 21 of hook element 6 on the small face of adjacent panel 2, whereas an undercut connection 18 is provided at the same point according to FIG. 12.

According to FIG. 13, the location for circular locking element 27 is, in contrast to FIG. 12, shifted to the free end of hook element 7 of panel 10. Locking groove 28 of corresponding hook element 6 is accordingly provided on receding surface 21 on the small face of adjacent panel 2. FIG. 13 is an example illustrating that locking element 27 can be provided at a location where a free space 17 is provided between the outer free end of bottom hook element 7 and opposite surface 21 of corresponding hook element 6. An embodiment without free space 17, with plane surfaces lying flat against each other, and an embodiment with an undercut connection 18 according to bottom hook element 7 in FIG. 12, can likewise be equipped with a locking recess and a locking element 27.

FIG. 14 illustrates a particularly stable hook connection 8, where two locking elements 26 and 27 with a circular cross-section are used. The locations of locking elements 26 and 27 constitute a combination of the embodiments according to FIG. 11 and FIG. 13.

FIGS. 15 and 16 show the installed state of panels 2 and 10 with completed hook connection 8. In this context, locking grooves 30, 31, 32, and 33 are provided in surfaces that lie roughly parallel to the plane of the installed panels. Again, locking grooves 30 and 32 of the one hook element 6, and locking grooves 31 and 33 of corresponding hook element 7, are positioned in such a way that they are exactly opposite each other and together each form a locking recess in which a locking element 34 or 35 is located. According to both FIG. 15 and FIG. 16, it is possible to dispense with one of locking elements 34 and 35, and the corresponding locking recess, in order to simplify the geometry. Since locking elements 34 and 35 have to prevent hook connection 8 moving apart in a direction perpendicular to the plane of panels 2 and 10, locking elements 34 and 35 are designed in such a way that they jam themselves laterally into the groove walls of locking grooves 30, 31, 32 and 33. In the practical examples illustrated, claw elements 34a and 35a are provided for this purpose, projecting from the surface of the locking elements. These claw elements can also be designed in the manner of barbs, where the barbs in the one locking groove 30 and the barbs in the opposite locking groove 31 of the same locking recess are oriented in opposite directions. The same applies to the barbs in locking grooves 32 and 33.

A further embodiment of hook connection 8 is illustrated in FIGS. 17 to 20. FIG. 17 shows a loose locking element 36 with a resilient snap tab 37, which is wide open in the relaxed state illustrated. FIG. 18 shows the gradual joining of hook connection 8 according to the direction of arrow P2. In this context, locking element 36 according to FIG. 17 is inserted in a groove 38 in the freely projecting surface 38a of upper hook element 6. Resilient snap tab 37 is bent back by the joining movement itself. As soon as hook connection 8 almost reaches the locking position shown in FIG. 19, snap tab 37 of locking element 36 automatically springs into locking depression 39 of corresponding hook element 7. In the position shown, snap tab 37 is less wide open than in the relaxed position illustrated in FIG. 17, meaning that it permanently exerts spring pressure on locking depression 39, thus securely locking hook connection 8.

A floor-layer can insert locking element 36 as a loose element into groove 38, provided in upper hook element 6, for this purpose, or it can be pre-mounted on hook element 6 by the manufacturer. Locking element 36 can extend over the entire length of the small face of a panel, or over only part of the length of the small face. In the practical example, it starts at one end of the small face and extends over half its length.

FIG. 19 shows that free spaces are present on both sides of snap tab 37. These can be used, for example, to pull locking element 36 out of hook connection 8 with the help of pointed pliers, and thus to release hook connection 8, for the purpose of disassembling panels 2 and 10.

FIGS. 18 and 19 show a design where the outer end of hook element 7, which faces base surface V, displays a free space 17 between it and corresponding hook element 6.

A further embodiment of the hook connection with a locking element 36 displaying an automatic snap tab 37 is illustrated in FIG. 20. The only difference compared to the embodiment according to FIG. 18 and FIG. 19 is that the free outer end of hook element 7 of panel 10, which faces base surface V, does not display a free space 17 between it and corresponding hook element 6 of connected panel 2. Instead, an undercut connection 18 is again provided, which, just like locking element 36, prevents hook connection 8 from moving apart in a direction perpendicular to the plane of installed panels 2 and 10.

According to FIG. 21, a different design of fastening system 1 provides a locking element in the form of a claw component 40, which, in assembled state, is located between interlocking hook surfaces 41 and 42 of hook elements 6 and 7. Claw component 40 displays claw elements 40a, which grip into the surface of hook surfaces 41 and 42, preventing vertical separation of hook elements 6 and 7. To create space for claw component 40 and to avoid constraining forces between hook elements 6 and 7, a free space 43 is formed between interlocking hook surfaces 41 and 42. FIG. 21 shows claw component 40 in the assembled state of hook connection 8. Claw component 40 is secured in recess 44 provided for this purpose in hook element 6 and adapts to hook element 6, starting at recess 44 and extending over hook surface 41. Recess 44 for claw component 40 is located on the part of hook element 6 that engages corresponding hook element 7, where the opening of recess 44 is located on a surface 45 of hook element 6 that faces the base surface. In this context, claw component 40 is bent in such a way that it projects into space 43 formed by interlocking hook surfaces 41 and 42.

Claw component 40 is of L-shaped design prior to assembly. A first leg of the L-shaped claw component is inserted in recess 44 of hook element 6. The second leg is provided with the claw elements and points roughly perpendicularly away from the small face of panel 10 prior to assembly. During assembly, the latter leg is automatically bent into space 43 between interlocking hook surfaces 41 and 42.

The final design of the fastening system according to the invention, illustrated in FIG. 22, makes use of a locking element in the form of clip 46. For this purpose, every panel 2 and 10 has, on its underside facing base surface V, undercut bottom recesses 47 and 48, one of which is located in the region of each hook element 6 or 7 on the underside of panel 2 or 10. One clip 46 engages one bottom recess 47 and 48 in each of two adjacent panels 2 and 10. So that clip 46 prevents hook connection 8 moving apart in a direction perpendicular to the plane of installed panels 2 and 10, each bottom recess 47 and 48 has an undercut. According to FIG. 22, the undercut of bottom recess 47 of a first panel 2 is, in the assembled state of two panels, oriented in the opposite direction to the undercut of bottom recess 48 of a second panel 10. Clip 46 is of U-shaped design. It is obvious that clip 46 also prevents plane, lateral separation perpendicular to hook elements 6 and 7 of the small faces of panels 2 and 10, thus supporting the function of hook connection 8.

FIG. 23 shows a locking element 50 with a special cross-section, which can, in practice, be replaced by locking element 51 shown in FIG. 26. The latter locking element 51 displays a simple, round cross-section. In addition, FIG. 23 shows an empty locking groove 52, in which locking element 50 can be accommodated in captive fashion. This captive design ensures that locking element 50 cannot fall out of locking groove 52 during handling of a panel 2, and during interlocking of hook connection 8, according to the direction of arrow P3. To permit the exchange of locking elements 50 and 51, locking grooves 52 and 53, provided in hook elements 6 and 7, are specially adapted to the geometry of the different locking elements 50 and 51.

Locking element 50 is a development of locking element 36, shown in FIG. 17. It displays a snap tab 54, which is shown in wide-open, relaxed state in FIG. 23. On back 55, locking element 50 displays a round form that, according to FIG. 24, matches and fits into locking groove 52 of hook element 6. Locking element 50 is provided with retaining elements 56 and 57, via which it can be fixed in locking groove 52 of hook element 6 in captive fashion. Retaining elements 56 and 57 additionally serve to prevent slipping or rotation of locking element 50 in locking groove 52 or in locking recess 58, formed by locking grooves 52 and 53. In the present embodiment, retaining elements 56 and 57 are designed as blunt toes. It can be seen on empty locking groove 52 in FIG. 23 that it has material recesses 56*a* and 57*a* at the edges of its semi-circular cross-section, these serving to accommodate retaining elements 56 and 57. Dimension A indicated on locking groove 52 is slightly smaller than dimension B indicated on locking element 50. This results in captive clamping of locking element 50 in locking groove 52. In a different embodiment, the retaining elements of locking element 50 are designed as barbs or claw elements (not shown), which can be fixed in part of the groove wall of locking groove 52 and hold locking element 50 in captive fashion on hook element 6. The material recesses 56*a* and 57*a* in locking groove 52 are not necessary with this design.

FIG. 24 Shows the joining procedure for hook connection 8. Panel 2 is swiveled down onto base surface V according to the direction of arrow P3, as a result of which hook elements 6 and 7 of panels 2 and 10 interlock. It is easily recognizable that locking element 50 is securely retained in locking groove 52 while the hook elements are connected in the manner described. As soon as the free end of snap tab 54 has passed upper edge 53*a* of locking groove 53, snap tab 54 automatically springs into locking groove 53, which serves as a locking depression for it and locks the hook connection, as illustrated in FIG. 25.

LIST OF REFERENCE NUMBERS

1 Fastening system
2 Panel
3 Panel
4 Tongue
4*a* Curved area
5 Groove
5*a* Curved depression
5*b* Lower groove wall
6 Hook element
7 Hook element
8 Hook connection
9 Footstep sound-insulating intermediate layer
10 Panel
11 Weight
12 Vertical offset
13 Locking element
14 Locking groove
15 Locking groove
16 Locking recess
17 Space
18 Undercut connection
19 Receding surface
20 Projecting surface
21 Receding surface
22 Locking element
23 Locking groove
24 Locking groove
25 Locking recess
26 Locking element
27 Locking element
28 Locking element
30 Locking groove
31 Locking groove
32 Locking groove
33 Locking groove
34 Locking element
34*a* Claw element
35 Locking element
35*a* Claw element
36 Locking element
37 Snap tab
38 Groove
38*a* Projecting surface
39 Snap-in depression
40 Claw component
40*a* Claw element
41 Hook surface
42 Hook surface
43 Space
44 Recess
45 Surface
46 Clip
47 Bottom recess
48 Bottom recess
50 Locking element
51 Locking element
52 Locking groove
53 Locking groove
53*a* Upper edge
54 Snap tab
55 Back 56 Retaining element
56a Material recess
57 Retaining element
57a Material recess
58 Locking recess
A Dimension
B Dimension
Direction of arrow
Direction of arrow
P3 Direction of arrow
V Base surface

What is claimed is:

1. A locking element for use in a hook connection of rectangular, tabular panels, in order to prevent, in a hooked state of two panels, release of the hook connection in a direction perpendicular to a plane of the hooked panels, said panels having corresponding hook elements on opposite small faces of each panel, wherein it is possible to make the hook connection with the corresponding hook elements of two similar panels, said locking element comprising:

a resilient snap tab,
wherein in a pre-mounted state, the locking element, in cross-section, has a first leg perpendicular to a panel plane and a second leg perpendicular to a small face, the second leg intended to be mounted into a groove of the small face, the groove in the small face and substantially perpendicular to the small face and the second leg attached to one end of the first leg, the second leg substantially perpendicular to the first leg and the resilient snap tab attached to the other end of the first leg; and
wherein, in a relaxed state of the resilient snap tab, the resilient snap tab extends inclined, outwardly from the small face such that the resilient snap tab projects at an oblique angle from the small face of the panel, and the resilient snap tab is changed in such a way that the resilient snap tab is resiliently bent towards the first leg and the locking element is shortened perpendicular to the small face during making of the hook connection in order to enable hooking of the hook elements.

2. The locking element according to claim 1, wherein said snap tab has elastic flexibility to obtain resilient spring action.

3. The locking element according to claim 1, wherein the resilient snap tab, displays a contact surface.

4. The locking element according to claim 3, wherein, when the locking element is pre-mounted on one of the hook elements, the contact surface is located in a plane that is inclined relative to the panel plane.

5. The locking element according to claim 3, wherein, when the hook connection is made, the contact surface is located in a plane that is inclined relative to the panel plane.

6. The locking element according to claim 3, wherein a function of the contact surface is to be in contact with a snap-in depression of the complementary hook element when the hook connection is made.

7. The locking element according to claim 1, wherein the resilient snap tab and the first leg have a substantial similar length.

* * * * *